(No Model.)

O. H. MUNSON.
WAGON BRAKE.

No. 547,020. Patented Oct. 1, 1895.

Witnesses
Thos. L. Getchel
H. A. Nau

Inventor
Orrie H. Munson
By John Wedderburn
his Attorney.

UNITED STATES PATENT OFFICE.

ORRIN H. MUNSON, OF HARTSVILLE, MASSACHUSETTS.

WAGON-BRAKE.

SPECIFICATION forming part of Letters Patent No. 547,020, dated October 1, 1895.

Application filed September 12, 1893. Serial No. 485,342. (No model.)

*To all whom it may concern:*

Be it known that I, ORRIN H. MUNSON, a citizen of the United States, residing at Hartsville, in the county of Berkshire and State of Massachusetts, have invented certain new and useful Improvements in Wagon-Brakes; and I do hereby declare the following to be a full, clear, and exact description of the invention, such as will enable others skilled in the art to which it appertains to make and use the same.

This invention relates to wagon-brakes, and has for its object to provide simple and effective means for braking wheels of the wagon by a movement of the body, and thereby apply the brake with a pressure proportionate to the load of the body.

With these and other objects in view the invention consists of the construction and arrangement of the several parts which will be more fully hereinafter described and claimed.

Figure 1:
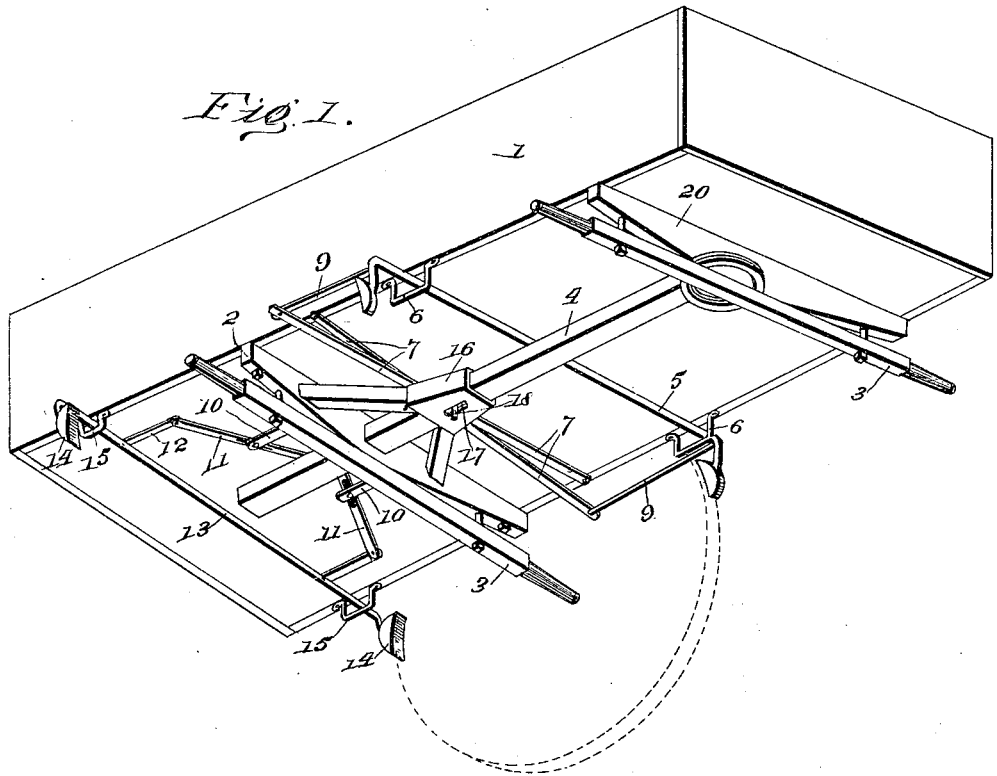
Figure 2:
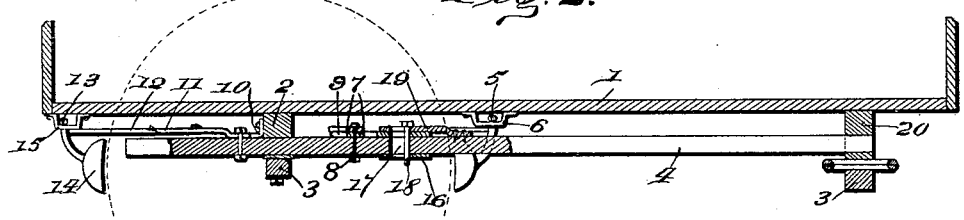
Figure 3:
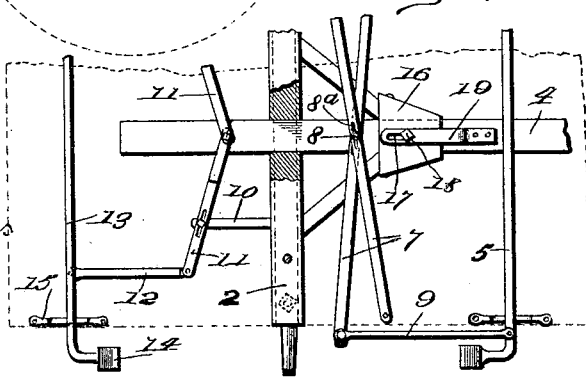

In the drawings, Figure 1 is a perspective view looking toward the bottom portion of a wagon, showing the wheel in dotted lines and embodying the invention. Fig. 2 is a central longitudinal section of the same. Fig. 3 is a bottom plan view of a portion of the wagon.

Similar numerals of reference are employed to indicate corresponding parts in the several views.

Referring to the drawings, the numeral 1 designates a wagon-body which is rigidly secured to the rear bolster 2 and slidingly mounted on the front bolster 20, both of which are respectively secured to axles 3 and engaged by a reach 4. The front brake-bar 5 is mounted in suitable guide-loops 6, attached to the body, and carries brake-shoes at the end thereof, and slightly in rear of the said front brake-bar are a pair of crossed levers 7 held by a fulcrum-bolt 8 to the reach 4, said bolt passing through elongated slots 8ª 8ª in said levers, one end of which lever is attached to the body 1 and the opposite end thereof is secured to the brake-bar 5 by a rod 9. When the box slides forward upon the forward bolster, it causes the free end of each lever 7 to move rearwardly toward the rear wheels, and said ends of the levers being attached to the front brake-bar by the rods, as set forth, the said brake-bar and the shoes carried thereby are moved against the front of the rear wheels. Attached to the rear bolster are a pair of guides 10, to which are pivoted in elongated slots a pair of levers 11, which are also attached to the reach-bar and are connected by rods 12 with the rear brake-bar 13, having brake-shoes on the ends thereof, as at 14, and passing through loop-guides 15 on the box 1. As the body moves forward it carries with it the rear axle 3, upon which the rear wheels are mounted. By this movement the bolsters 2 and 20 are caused to approach one another and the reach 4 is thrown relatively backward actuating through the levers 11 to draw forward the brake-shoes 14 against the rear part of the wheel. Simultaneously, therefore, with the operation of the front brake-bar the back brake-bar is brought to bear on the rear of the back wheels and thereby thoroughly brake the wagon. Where the hounds 16 meet upon the reach-bar 4 a slot 17 is formed, which receives a pin 18 carried at the rear end of the hammer-strap 19 and extending rearwardly from a securing plate or base of said strap, which is attached to the reach-bar in advance of the meeting-point of the hounds. By these means the hounds are allowed to slide under the said hammer-strap and permit the rear wheels to come forward near to the forward wheels and causes the reach to slip back through the rear bolster. By this means the weight of the load is applied through the brake on the wheels without placing the strain upon the draft-animals.

The invention as herein set forth is especially adapted to be used under loads of bulk, like hay, straw, and corn in stalks, where ordinary brakes cannot be used on account of the brake mechanism and operating-levers being in the way of said material.

Having thus described the invention, what is claimed as new is—

In a device of the character set forth, the combination with a wagon body rigidly secured to the rear bolster and slidingly connected to the forward bolster, of a reach secured to the front bolster and slidingly connected with the rear bolster, a pair of crossed levers fulcrumed in elongated slots to said reach, secured at one end to said body and connected through suitable rods or pitmen to the forward brake-shoes, and a pair of levers pivoted to the rear end of said reach, fulcrumed in elongated slots to guides secured to the rear bolster, and connected through suitable rods or pitmen to the rear brake shoes, substantially as and for the purpose described.

In testimony whereof I have signed this specification in the presence of two subscribing witnesses.

ORRIN H. MUNSON.

Witnesses:
  O. C. BIDWELL,
  FRANK H. WRIGHT.